(12) United States Patent
Rosado

(10) Patent No.: US 12,153,707 B2
(45) Date of Patent: Nov. 26, 2024

(54) SYSTEMS AND METHODS OF PERSONALLY IDENTIFIABLE INFORMATION (PII) TRACKING IN A NETWORK

(71) Applicant: salesforce.com, inc., San Francisco, CA (US)

(72) Inventor: Eidan James Rosado, Highlands Ranch, CO (US)

(73) Assignee: Salesforce, Inc., San Francisco, CA (US)

( * ) Notice: Subject to any disclaimer, the term of this patent is extended or adjusted under 35 U.S.C. 154(b) by 426 days.

(21) Appl. No.: 17/504,628

(22) Filed: Oct. 19, 2021

(65) Prior Publication Data

US 2023/0120348 A1    Apr. 20, 2023

(51) Int. Cl.
| | |
|---|---|
| *G06F 21/62* | (2013.01) |
| *G06F 16/901* | (2019.01) |
| *G06F 40/284* | (2020.01) |
| *G06F 40/40* | (2020.01) |
| *G06Q 50/00* | (2024.01) |

(52) U.S. Cl.
CPC ...... *G06F 21/6245* (2013.01); *G06F 16/9024* (2019.01); *G06F 40/284* (2020.01); *G06F 40/40* (2020.01); *G06Q 50/01* (2013.01)

(58) Field of Classification Search
CPC ............ G06F 21/6245; G06F 16/9024; G06F 40/284; G06F 40/40; G06F 40/166; G06Q 50/01
See application file for complete search history.

(56) References Cited

U.S. PATENT DOCUMENTS

| | | | |
|---|---|---|---|
| 9,143,468 B1* | 9/2015 | Cohen ................... | H04L 51/216 |
| 2015/0120721 A1* | 4/2015 | Kim ....................... | G06F 16/248 |
| | | | 707/728 |
| 2016/0217348 A1* | 7/2016 | Cho ........................ | G06V 40/20 |

(Continued)

OTHER PUBLICATIONS

Milne et al., "Information Sensitivity Typology: Mapping the Degree and Type of Risk Consumers Perceive in Personal Data Sharing", webpage from https://www.researchgate.net/publication/304033920, Journal of Consumer Affairs—Spring 2017, vol. 51, No. 1, pp. 133-161.

*Primary Examiner* — Michael Simitoski
*Assistant Examiner* — Hany S. Gadalla
(74) *Attorney, Agent, or Firm* — Butzel Long

(57) ABSTRACT

Systems and methods are provided for receiving, at a server, activity data from one or more social networks that include one or more posts from a user. A network graph based on the one or more posts from the received activity data. The server may tokenize the contents of the one or more posts. The server may label and categorize the tokenized posts. Personally identifiable information (PII) may be determined from the labeled and categorized posts that are tokenized. A risk report may be generated based on determined PII in at least one of the labeled and categorized posts that are tokenized, and the risk report may be transmitted. In some implementations, the server may provide an application for composition of a social media post, where the application provides real-time feedback and content risk assessment of the post, and provides recommendations for reducing or eliminating PII in the post.

7 Claims, 7 Drawing Sheets

(56) References Cited

U.S. PATENT DOCUMENTS

| | | | |
|---|---|---|---|
| 2018/0144138 A1* | 5/2018 | Zhang | G06F 21/577 |
| 2022/0164472 A1* | 5/2022 | Cannon | G06F 21/6245 |
| 2022/0286438 A1* | 9/2022 | Burke, Jr. | H04L 63/1416 |

* cited by examiner

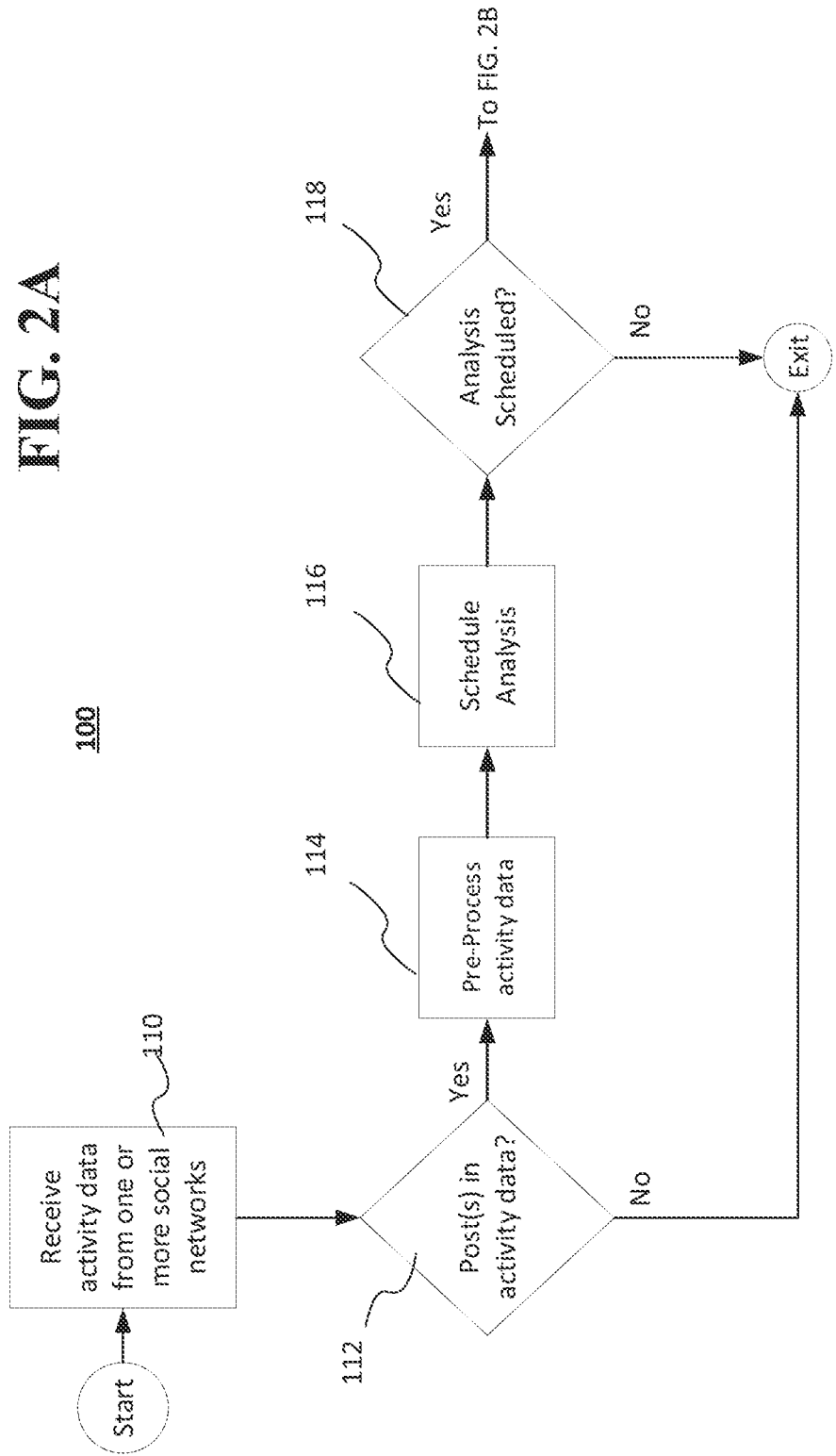

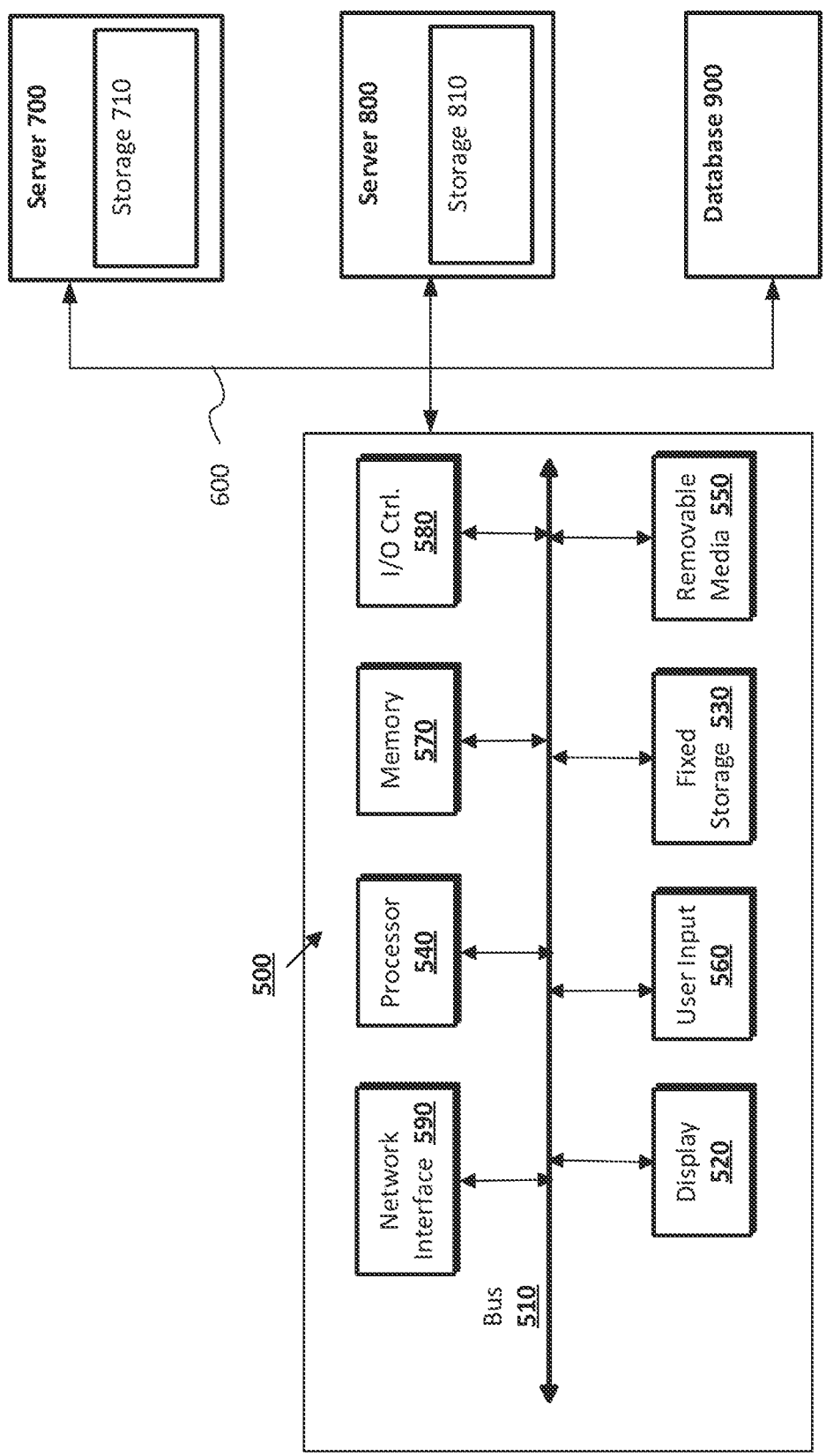

SYSTEMS AND METHODS OF PERSONALLY IDENTIFIABLE INFORMATION (PII) TRACKING IN A NETWORK

BACKGROUND

Social networks, which typically include social media websites, play a number of roles across individuals, cultural groups, industries, and the like. For example, commercial and academic use of social networks typically includes marketing, event reporting, and behavioral research. Social networks typically contribute to creating connections across individuals, regions, and cultural groups. Social networks may also play a role in accidental or intentional disclosure of Personally Identifiable Information (PII).

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIGS. 2A-2B show a more detailed version of the example asynchronous PII detection method of FIG. 1 according to an implementation of the disclosed subject matter.

FIG. 6 shows hardware components that may implement the system of FIG. 5 according to an implementation of the disclosed subject matter.

DETAILED DESCRIPTION

Figure 1:
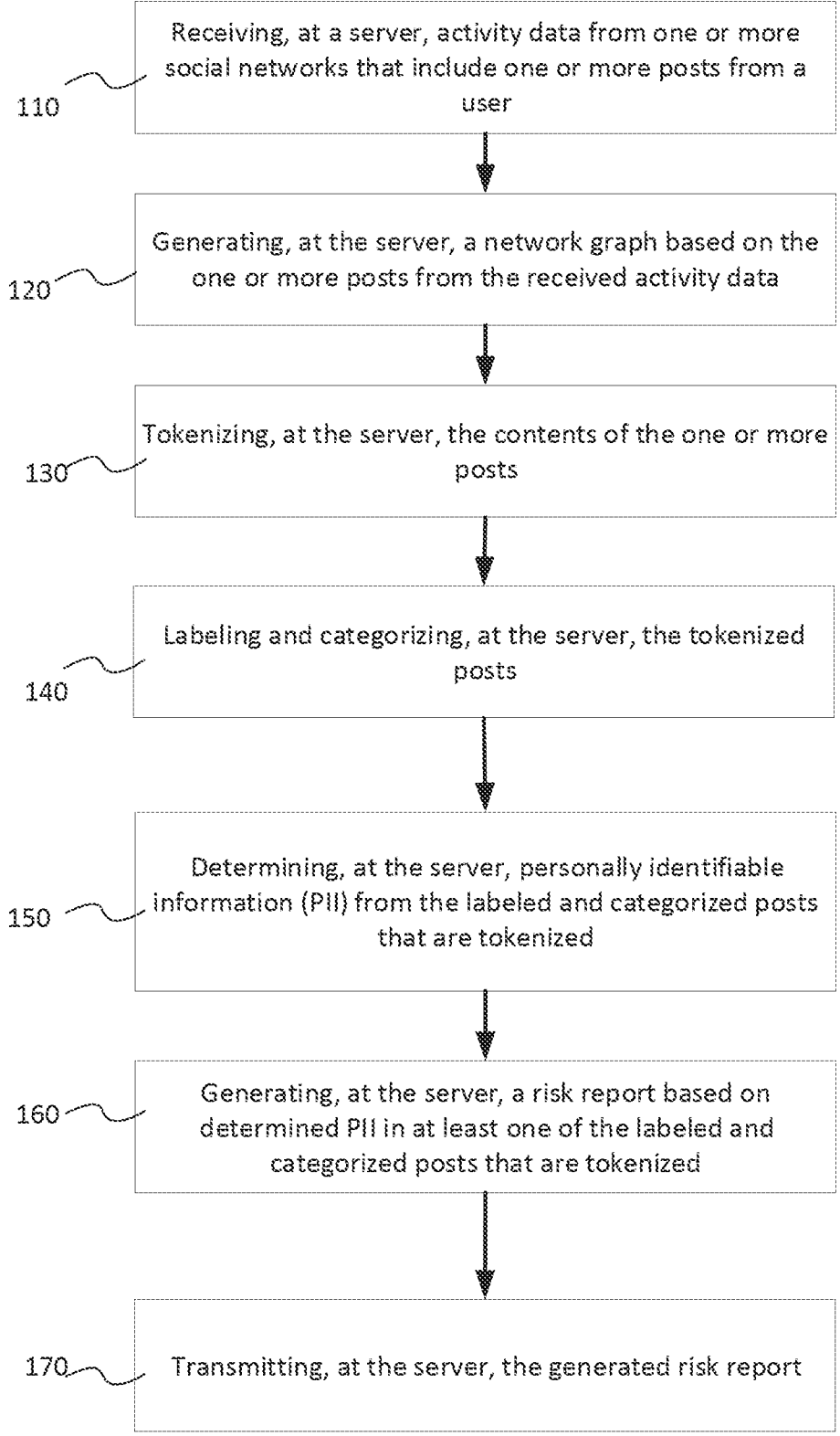
FIG. 1 shows an example method of asynchronous PII detection according to an implementation of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

The inventive concept uses network analysis, content analysis, and trend analysis to detect patterns of disclosure by a user within a network (e.g., a social media network or a network with similar communication patterns). Users asocial networks often disclose Personally Identifiable Information (PII), which may be exploited by others, and may pose threats to electronic accounts of the user, and to computer security.

In some implementations of the disclosed subject matter, systems and methods may provide a real-time preventative PII detection by evaluating draft postings prior to being published by a social network. That is, instead of interacting directly with a social network account, the systems and methods of the disclosed subject matter may allow for composition of a draft social media post prior to being published. The disclosed subject matter may provide real-time feedback and content risk assessment of the draft post, and may provide recommendations for reducing or eliminating PII in the post (e.g., removal of the disclosure, modification of the disclosure, or the like). This may increase security of a user's electronic accounts, as well as increase computer security, as it prevents PII from being published and used by others to gain unauthorized access to and/or control of accounts and/or computers.

In some implementations of the disclosed subject matter, systems and methods may perform asynchronous PII detection, which may be scheduled by the user. At the scheduled time, data (e.g., posts and other information) may be retrieved from a user's social network. The data may be processed, and a network graph may be generated to determine where an influencing of the user's posting may have happened. The analysis may include determining whether a post may be part of a posting trend, and may determine the overall reach of the trend. Relationships having at least a predetermined level of significance are traversed in the network graph to determine if one or more influencers have influenced the posts of the user. Implementations of the disclosed subject matter may label and categorize the content posted, and provide a risk assessment of any personal identifiable information that may have been disclosed. The systems and methods of the disclosed subject matter may provide a notification to the user of detected PII disclosure, the risks associated with the disclosure based on the types of data detected, and an average risk score of the post. That is, the user's past posting behavior on the social network may be analyzed, and a risk report may be provided. The risk report may include proposed changes to reduce disclosure of PII.

Natural language processing methods may be used to process the content of the post to determine elements of the post to be categorized as PII elements (other elements of the post may be discarded for analysis purposes). The content may be tokenized, and the categorization of the tokens may be used to determine which tokens include PII.

The output for the real-time preventative PII detection application and/or the asynchronous PII detection may include the detected PII and its severity, risk factors associated with the type of PII disclosure, one or more steps the user can take or an option to accept risk, and/or whether the PII disclosure was due to influence (e.g., response to post with high influencer power, or was in response to a posting trend, or the like).

Implementations of the disclosed subject matter provide systems and methods to address accidental and/or intentional PII disclosure by users via social networks. A user may track previous behaviors and/or posts with a social network, and their interactions with others. Social network influencers, whether businesses or individuals, may have an impact on their followers, and may intentionally or inadvertently sway followers to post particular content that may include PII. For example, users of a social network may post PII in response to trending events such as #FollowFriday, #TransformationTuesday, or the like.

Implementations of the disclosed subject matter may provide users with tools to view PII disclosures or potential PII disclosures, the severity of the data disclosed, and/or provide recommended actions to take to limit or eliminate future PII disclosures in social network posts. That is, implementations of the disclosed subject matter improve the working of computers by increasing computer security, and increasing the security of electronically-accessible accounts which may include sensitive information. Reducing or eliminating PII posted by a user to social networks may provide increased security, as such personal information may be used by others to compromise computer security and/or unlawfully gain control of electronic accounts (e.g., bank and/or financial accounts, medical record accounts, electronic mail accounts, and/or the user's computer).

Figure 2B:
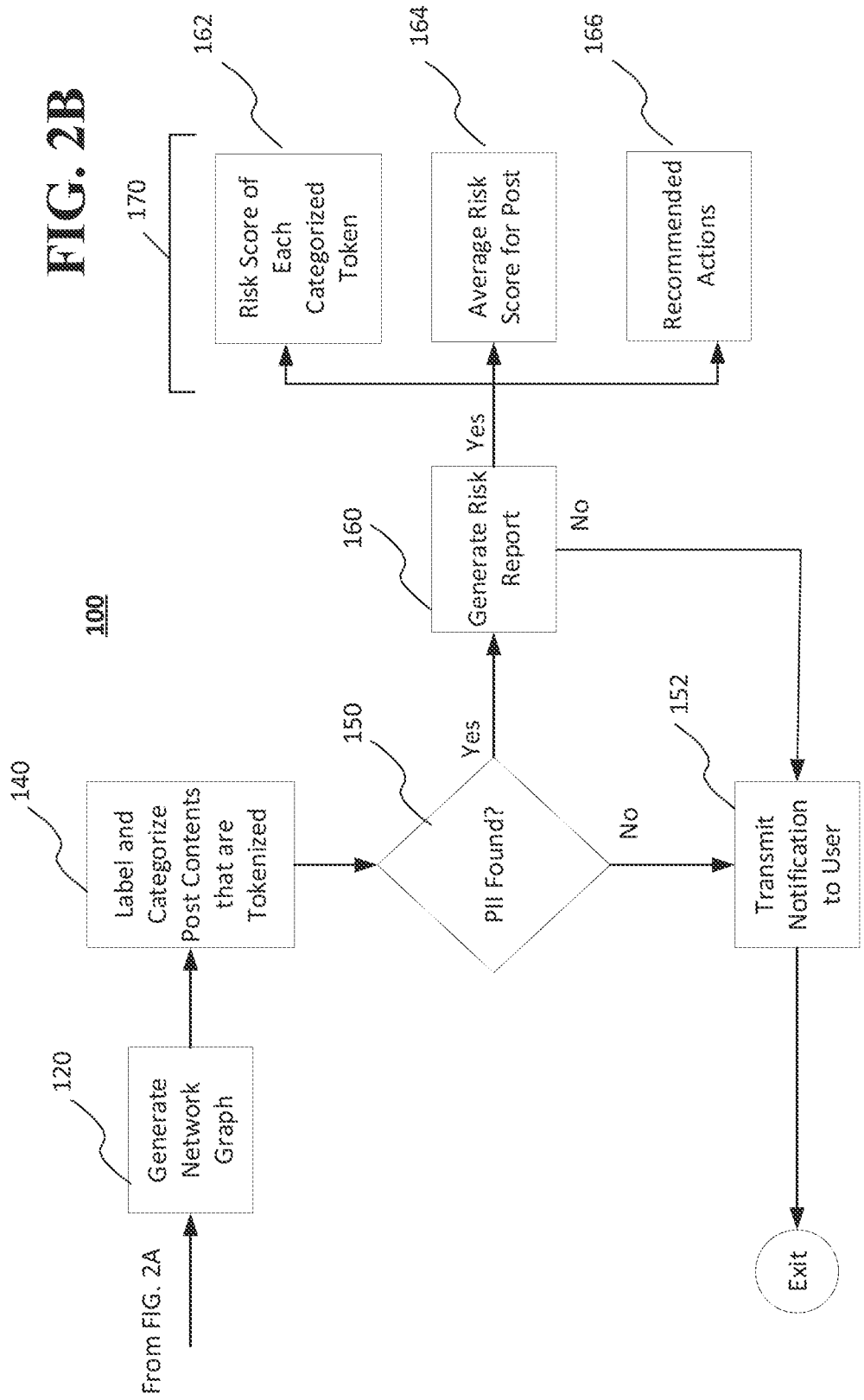

FIG. 1 shows an example method 100 of asynchronous PII detection according to an implementation of the disclosed subject matter. FIGS. 2A-2B show a more detailed version of the method 100 of FIG. 1 according to an implementation of the disclosed subject matter.

Figure 5:
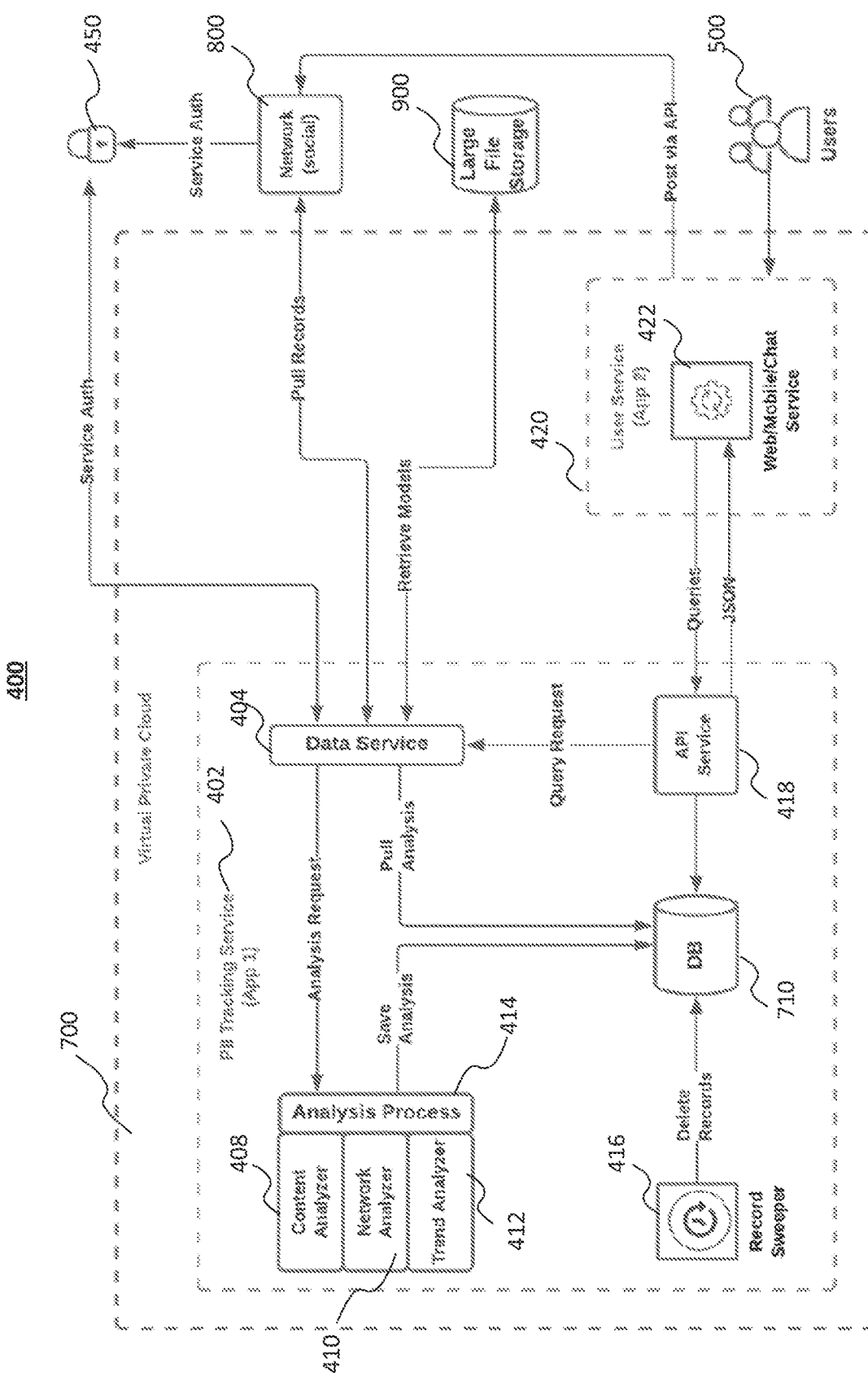
FIG. 5 shows a system that may perform the method of FIGS. 1-4 according to implementations of the disclosed subject matter.

The method 100 of FIGS. 1-2B may be performed on system 400 shown in FIG. 5 and/or the system shown in FIG. 6. For example, the asynchronous PII detection method 100 may be performed by PII tracking service application 402 executed by server 700. In some implementations, PII tracking service application 402 may be executed on a virtual private cloud, which may be server 700 shown in FIGS. 5-6. The PII tracking service 402 may retrieve activity data (e.g., one or more posts, user data, or the like) from server 800, which may be part of a social network.

At operation 110 shown in FIGS. 1 and 2A, a server may receive activity data from one or more social networks that include one or more posts from a user. For example, data service interface 404 shown in FIG. 5 may retrieve the activity data (e.g., records) from the server 800 of the social network, and may provide them to analysis processor 414. In another example, server 700 shown in FIG. 6 may receive activity data from server 800 and/or database 900 via communications network 600.

In some implementations, the server may determine whether the one or more social networks in the received activity data include the one or more posts at operation 112 as shown in FIG. 2A. That is, the server may determine whether the activity data includes posts made by a user. For example, it may be determined whether there are new posts since the previous reception of activity data. In another example, it may be determined whether there are posts within a particular range of dates and/or times. If the server determines that there are no posts in the activity data, the asynchronous PII detection method may be exited.

When the server determines that there are one or more posts included in the activity data, the server may pre-process the activity data at operation 114 shown in FIG. 2A. The pre-processing may include separating the one or more posts from other activity data. At operation 116 of FIG. 2A, the server may schedule an analysis of the pre-processed activity data. That is, the server may schedule the analysis of the activity data for a predetermined period of time. For example, the analysis may be scheduled based on other tasks that the server is performing, and/or the availability of the user who engaged with one or more social networks and generated the activity data. In another example, the server may receive a request from a user's computer 500 to schedule the analysis. At operation 118 shown in FIG. 2A, the server may determine whether the analysis has been scheduled. If the analysis has been scheduled, operation 120 may be performed. If the server determines that the analysis has not been scheduled, the operations of method 100 may be ended. Alternatively, the server may periodically determine whether the analysis has been scheduled.

At operation 120 shown in FIGS. 1 and 2A, the server may generate a network graph based on the one or more posts from the received activity data. For example, network analyzer 410 of FIG. 5 may generate a network graph from the activity data retrieved from the server 800 of the social network via the data service interface 404. In another example, server 700 may generate the network graph from the activity data received from server 800 and/or database 900 shown in FIG. 6. The network graph may include users of the social network, including the user, as nodes, along with the ties, edges, or links (relationships or interactions) that connect them. That is, the network graph may include relationship information between the user and other users of the social network. For example, the network graph may include information about which posts authored by the user influenced other users of the social network, and/or whether the user may have been influenced by posts of users that may be considered influencers.

At operation 130, the server may tokenize the contents of the one or more posts. That is, the words, numbers, symbols, and the like included in the one or more posts may form individual groups, which may be referred to as tokens. For example, content analyzer 408 shown in FIG. 5 may tokenize the words, numbers, and/or symbols of the one or more posts included with the received activity data from the server 800 of the social network via the data service interface 404. In another example, the server 700 may tokenize the words, numbers, and/or symbols of the one or more posts included with the activity data received from the server 800 and/or the database 900 via the communications network 600. An example post, and the tokenization of the post, is described in detail below in connection with FIGS. 1-4.

At operation 140, the server may label and categorize the tokenized posts. For example, the content analyzer 408 shown in FIG. 5 may label and categorize the tokenized posts. In another example, the server 700 may label and categorize the tokenized posts. That is, each tokenized element of the post may be categorized (e.g., according to a categorization and/or classification scheme), and the categorized tokens may be labeled according to the category in which the token is placed.

In some implementations, categories may include a name (e.g., full name, maiden name, mother's maiden name, alias, or the like), a personal identification number (e.g., a Social Security number passport number, driver's license number, or the like), an address (e.g., an email address, a street address, or the like), a phone number (e.g., a mobile phone number, personal phone number, business phone number, or the like), personal characteristics (e.g., photographic image, medical image, fingerprint, biometric data, or the like), information identifying personal property (e.g., vehicle registration number), information linkable to the user (e.g., date of birth, place of birth, race, religion, medical information, education information, and/or financial information), or the like.

In some implementations, the categories may include basic demographics, financial information, secure identifiers, contact information, personal preferences, and community interaction. Basic demographics may include zip code, birth date, hometown, gender, race, occupation, number of children, income level, shopping behavior, height, birth date, financial information, marital status, country of citizenship, or the like. Financial information may include credit card number, financial account numbers, or the like. Secure identifiers may include a social security number, access codes, passwords, GPS location, fingerprint, or the like. Contact information may include internet protocol (IP) address, home phone number, cell phone number, work phone number, work contact information, or the like. Personal preferences may include religion, political affiliation, online screen name, or the like. Community interaction may include social networking profile, picture of face, or the like.

At operation 150 as shown in FIGS. 1 and 2B, the server may determine personally identifiable information (PII) from the labeled and categorized posts that are tokenized. For example, the content analyzer 408 shown in FIG. 5 may determine the PII from the labeled and categorized posts that are tokenized. In another example, server 700 shown in FIG. 6 may determine the PII from the labeled and categorized posts that are tokenized. If it is determined that there is no PII in the labeled and categorized posts that are tokenized, the server may transmit a notification to the user at operation 152. For example, the notification may be transmitted from server 700 via communications network 600 to computer 500, as shown in FIG. 6.

At operation 160, the server (e.g., server 700 shown in FIGS. 5-6) may generate a risk report based on determined PII in at least one of the labeled and categorized posts that are tokenized. The risk report may include a risk score of each categorized token, an average risk score for a post, recommend actions (e.g., editing the post to remove PII, deleting the post, or the like). An example tokenization and categorization of a post is discussed below in connection with FIGS. 1-4, along with sample output information for the risk report.

In some implementations, the analysis processor 414 shown in FIG. 5 may use information from the content analyzer 408, the network analyzer 410, and/or trend analyzer 412 to generate a risk report at operation 160. In another example, the server 700 shown in FIG. 6 may generate a risk report based on determined PII in at least one of the labeled and categorized posts that are tokenized. If the server is unable to generate a risk report, a notification may be transmitted to the user at operation 152 shown in FIG. 2B. For example, the server 700 shown in FIG. 6 may not be operating normally, and may be unable to generate the risk report at that time. A notification may be transmitted by the server 700 via the communications network 600 to the computer 500 of the user, which may display the notification on display 520.

The generation of the risk report may include determining, at the server, a risk score of each of the categorized posts that are tokenized at operation 162 shown in FIG. 2B. The generation of the risk report may include determining, at the server, an average risk score for the one or more posts at operation 164 shown in FIG. 2B. The generation of the risk report may include the server generating one or more recommended actions based on the determined PII in at least one of the labeled and categorized posts that are tokenized at operation 166. In some implementations, the server may determine an influencing post that resulted in the one or more posts that include the determined PII from the generated network graph. An example tokenization and categorization of a post is discussed below in connection with FIGS. 1-4, along with sample output information for the risk report.

At operation 170, the server may transmit the generated risk report. For example, the server 700 shown in FIG. 6 may transmit the generated risk report via communications network 600 to computer 500 for display on display 500.

Figure 3:
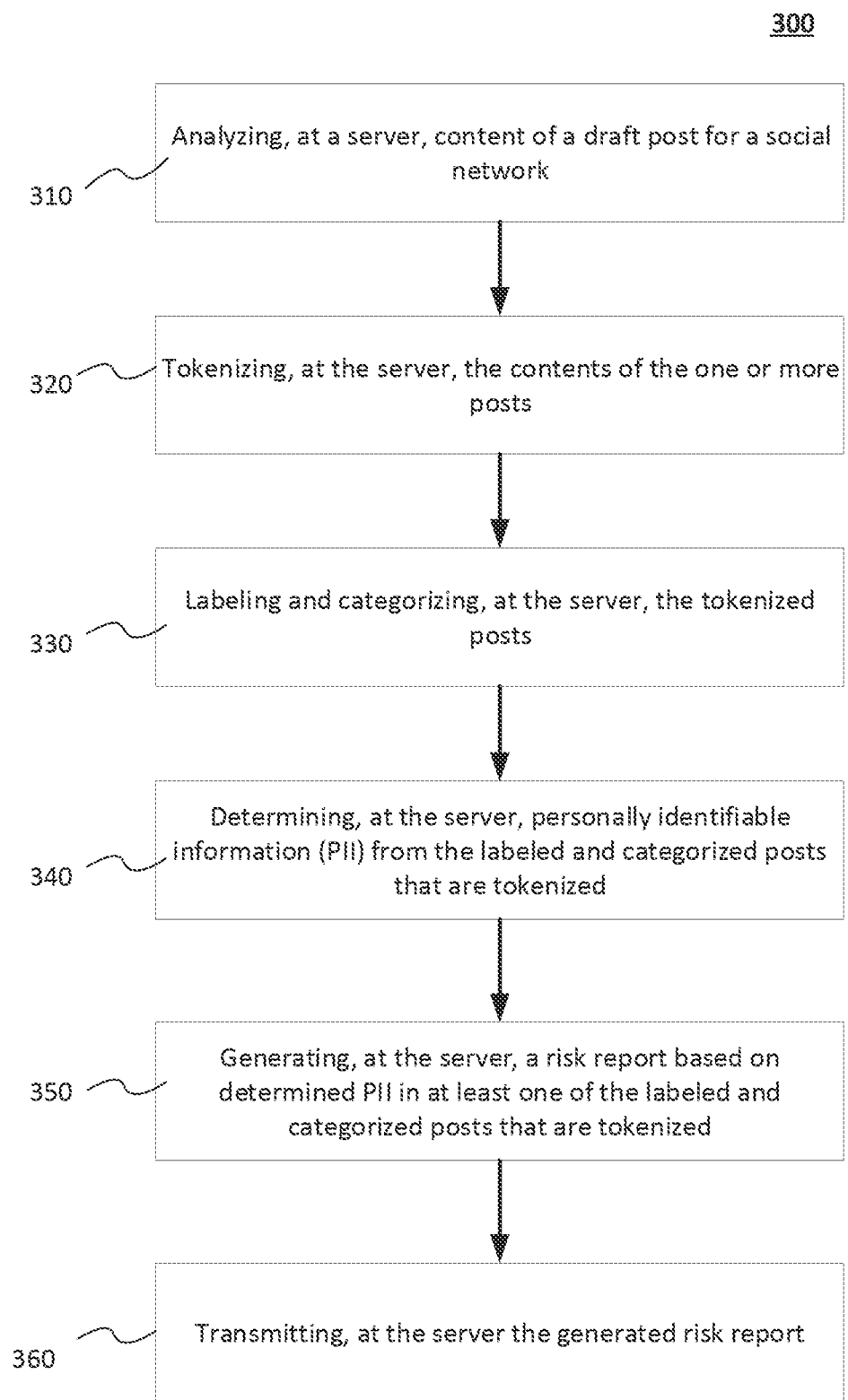
FIG. 3 shows an example real-time preventative PII detection method according to an implementation of the disclosed subject matter.
Figure 4:
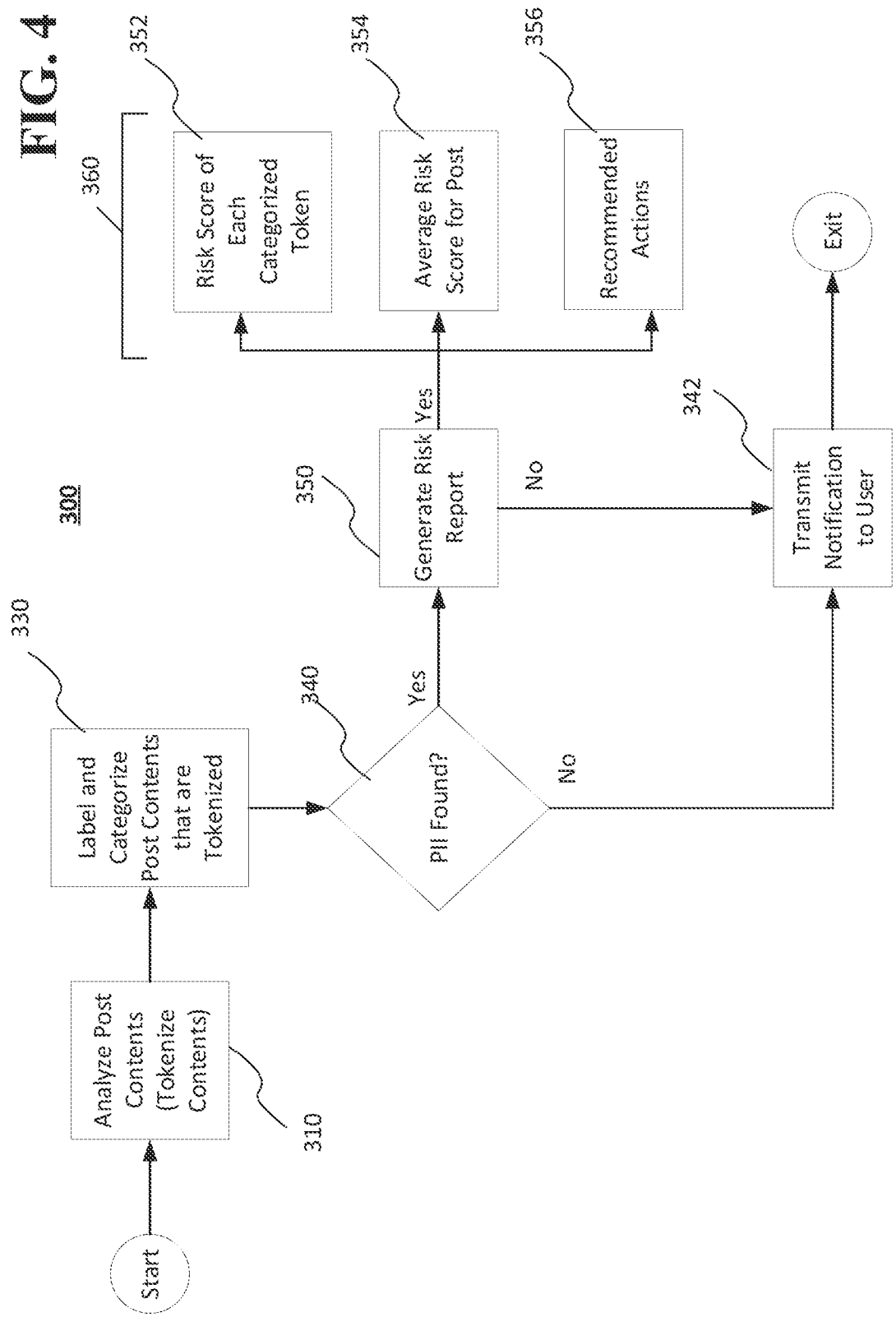
FIG. 4 shows a more detailed example of the real-time preventative PII detection method shown in FIG. 3.

FIG. 3 shows an example real-time preventative PII detection method 300 according to an implementation of the disclosed subject matter. FIG. 4 shows a more detailed example of the real-time preventative PII detection method 300 of FIG. 3.

Method 300 of FIGS. 3-4 may be performed on system 400 shown in FIG. 5 and/or the system shown in FIG. 6. For example, a computer 500 of a user may be communicatively coupled to the server 700, and may interface with the user interface 422 to compose a draft post for the social network. The draft post may be provided to the PII tracking service application 422 via the API 418 for analysis by analysis processor 414, content analyzer 408, network analyzer 410, and/or trend analyzer 412, which may perform one or more operations of method 300 of FIGS. 3-4.

At operation 310 shown in FIGS. 3-4, the server (e.g., server 700 shown in FIG. 6) may analyze content of a draft post for a social network. The analysis of the content may include separating the text, symbols, images, or the like before tokenization of the contents of the post at operation 320. Operation 320 may be similar to operation 130 described above in connection with FIG. 1.

At operation 330 as shown in FIGS. 3-4, the server may label and categorize the tokenized posts. Operation 330 may be similar to operation 140 shown in FIGS. 1 and 2B and described above, and may use similar categories to categorize and label the contents of the post.

At operation 340 as shown in FIGS. 3-4, the server may determine personally identifiable information (PII) from the labeled and categorized posts that are tokenized. Operation 340 may be similar to operation 150 shown in FIGS. 1 and 2B and described above. When operation 340 determines that there is no PII in the labeled and categorized posts that are tokenized, the server may transmit a notification to the user. For example, the server 700 may transmit a notification via the communications network 600 to the computer 500.

At operation 350 as shown in FIGS. 3-4, the server may generate a risk report based on determined PII in at least one of the labeled and categorized posts that are tokenized. In some implementations, the server may determine a risk score of each of the categorized posts that are tokenized at operation 352 as shown in FIG. 4. Operation 352 may be similar to operation 162 as shown in FIG. 2B and described in detail above. In generating the risk report, the server may determine an average risk score for the one or more posts at operation 354 as shown in FIG. 4. Operation 354 may be similar to operation 164 as shown in FIG. 2B and described above. In some implementations, the server may generate one or more recommended actions based on the determined PII in at least one of the labeled and categorized posts that are tokenized at operation 356 as shown in FIG. 4. Operation 356 may be similar to operation 166 as shown in FIG. 2B and described above. The one or more recommended actions may include receiving, at the server, edits to the draft post to remove the determined PII, and transmitting the edited draft post to be posted to the social network. For example, the server 700 shown in FIG. 6 may receive the edited post from the computer 500 via the communications network 600. The user of computer 500 may use the user interface (e.g., user input 560 and display 520) to edit the text of the post. The server may transmit the edited draft post to be posted on the social network. For example, the server 700 may transmit the edited draft post to the server 800 to be posted on the social network operated by the server 800.

At operation 360, the server may transmit the generated risk report. For example, the server 700 may transmit the generated risk report via the communications network 600 to computer 500.

In some implementations, the server may receive edits to the draft post based on the generated risk report. For example, the server 700 shown in FIG. 6 may receive the edited post from the computer 500 via the communications network 600. The user of computer 500 may use the user interface (e.g., user input 560 and display 520) to edit the text of the post. The server may transmit the edited draft post to be posted on the social network. For example, the server 700 may transmit the edited draft post to the server 800 to be posted on the social network operated by the server 800.

The methods described in FIGS. 1-4 may be used to determine PII in the following example post, which may be a draft post or may be a post that a user has made to a social network:

```
@CurrentUser <timestamp>
@MentionOfSomeUserAsResponse
I feel that! I was born in Boston Mass in 1990, so I
totally get what you are saying. Feel free to email me at
currentUser@emailprovider.com or call me at 555-555-5555.
I'd be happy to help.
```

Using natural language processing methods, the content of the post may be tokenized (e.g., at operation 130 shown in FIG. 1 or operation 320 shown in FIG. 3), with the tokens being labeled and categorized (e.g., at operation 140 shown in FIG. 1, or at operation 330 shown in FIG. 3), or discarded as needed. That is, the PII elements of the post may be labeled and categorized, and non-PII elements may be discarded.

The PII tracking service application 402 of server 700 shown in FIG. 5 may flag the above example post, as it includes both an email address and a phone number of the user, which are examples of PII. The content analyzer 408 shown in FIG. 5 may determine that the email address and the phone number as PII, as this tokenized information would be categorized as matching patterns for valid emails and valid phone numbers. Other elements of the post, such as the city and the year that the user was born may be tokenized, and the content analyzer 408 may determine that the user disclosed a birth year in a particular city, based on the categorization and labeling of the tokens. For the tokens that have been categorized and labeled, the content analyzer 408 may rank the token in severity of disclosure.

In the above example post, "555-555-5555" may be categorized as a phone number by the content analyzer 408. The "currentUser@emailprovider.com" from the post may be categorized as an email, "Boston" may be categorized as city of birth, and "1990" may be categorized as year of birth. The content analyzer 408 may assign risk values to each of the categorized tokens. Risk values could be numbers from one (1) to three (3), where 1 is the least risk, and 3 is the highest risk. These risk values are merely an example, and other risk numbering systems may be used (e.g., values from 1-5, 1-10, or the like). In the example post above, the email and phone number tokens may be assigned a risk value of 3, and the city of birth and the year of birth may be assigned a risk value of 2 by the content analyzer 408. That is, the risk value of 1 may be information that is partially linkable to the user, the risk value of 2 may be linkable to the user, and risk value 3 is directly PII. The risk values for the categorized tokens may be output as part of the risk report (e.g., the risk report generated at operation 160 shown in FIGS. 1 and 2B, and/or operation 350 shown in FIGS. 3-4). The risk score of each categorized token may be output as part of the risk report at operation 162 shown in FIG. 2B or operation 352 of FIG. 4. In some implementations, an average risk score may be calculated for the post. In the example post above, the content analyzer 408 may calculate the average risk value of the post as 2.5. In the example risk value scale of 1-3, this average risk value of 2.5 may categorize the post as a high-risk post.

The network analyzer 410 shown in FIG. 5 may determine, based on a generated network graph, whether there are any relationships in the form of mentions, replies, and/or direct follows around the date of the post that may be a result of influence. Such information may be determined, for example, at operations 160 of FIGS. 1 and 2B, or operation 350 shown in FIGS. 3-4 and output as part of the generated risk report so that the user has that information as well. For example, the generated risk report may include the average risk value of 2.5 determined by the content analyzer 408, and a detection of influence as determined by the network analyzer 410 based on the generated network graph (e.g., at operation 120 shown in FIGS. 1 and 2B).

The trend analyzer 412 may determine whether the content of the post as determined by the network analyzer 410 may be part of a posting trend (e.g., based on the generated network graph of the network analyzer 410 and/or social network data). For example, the trend analyzer 412 may determine whether the contents of the post matched a trend such as #TransformationTuesday or #FollowFriday, where groups of individuals may share information to gather more followers, or meet new individuals that work within the same field as the user, or have similar interests. For example, #TransformationTuesday may be a posting trend where people share their results of the transformation they have gone through a period of time (e.g., a physical transformation based on a fitness journey, a stylistic transformation based on a new haircut, hair coloring, or clothing, or the like). Another example may be #FollowFriday, where a social network user may recommend one or more people to follow on a social network in a post.

When method 100 shown in FIGS. 1-2B transmits the generated risk report at operation 170 or when method 300 shown in FIGS. 3-4 transmits the generated risk report at operation 360, the generated risk report may include the PII detected in the post or draft post, and the severity of the disclosure based on a risk value. In the example post above, the classified tokens that were identified as risky, the risk level of each token, and the average risk level of the post (e.g., an average risk level of 2.5, as described above) may be included in the risk report.

The generated risk report may include the risk factors associated with each type of PII disclosure. For example, the disclosures in the above example post may be used in combination with one another by another to attempt an unlawful entry of an electronic account and/or to obtain unlawful control of a computer.

The generated risk report may include one or more steps and/or actions for drafting future posts to avoid and/or eliminate disclosure of PII, edit a draft post to remove at least a portion of the PII, or select an option to accept the risk and publish the draft post with the PII on a social network. In some implementations, the generated risk report may recommend removal of the published post on the social network, if the post is not editable. For example, some social networks may only permit deletion of posts, but may not support editing of previously-published posts.

The generated risk report may include information about whether the PII disclosure in the post or draft post disclosure may be due to one or more influences, such as in response to an influential poster or a posting trend. The generated risk report may state what trend was detected by the trend analyzer 412, or what relationship exists that the influence for the disclosure of PII may have come from (e.g., if the disclosure of PII was in response to an influencer, or the like).

FIG. 5 shows a system 400 that may perform the method of FIGS. 1-4 according to implementations of the disclosed subject matter. The system 400 may include an applications programming interface (API) 418 of a PII tracking service application 402 that may be separate from the user interface 422 (e.g., a website interface, a mobile interface, a chat interface, or the like) of a user service application 420. A server 700 may execute the PII tracking application 402 and the user service application 420. The server 700 may be part of a virtual private cloud computing system. A service authorization 450 may be used to control communications between the social network of server 800 and the services interacting with it (e.g., the PII tracking service application 402, the user service application 420, and the like). Server 700 and server 800 are described below in connection with FIG. 6. The PII tracking service application 402 and the user service application 420 may be executed by server 700 and/or the virtual private cloud computing system that the server 700 may be part of, which may prevent unwanted network activity. As a user of a social network 800 may give the system 400 (e.g., the PII tracking service application 402 and the user service application 420) access to a private social network account. In some implementations, data that is retrieved from the social network server 800 by the PII tracking service application and/or that may be generated by analysis of one or more posts and stored in database 710 may be deleted upon receipt of a request from a user (e.g., using computer 500). For example, record sweeper 416 may delete records from the database 710.

A user with computer 500 may access the user service application 420, and may use the user interface 422 to draft a post for a social network provided by server 800. In some implementations, the user may select the draft post to be submitted to the server 800 without determining PII information in the draft post, and may subsequently schedule analysis of one or more posts to the social network of server 800 (e.g., at operation 116 shown in FIG. 2A, and as described in method 100 shown in FIGS. 1-2B and described above).

In some implementations, a query from the API service 418 may use the data service interface 404 to retrieve an analysis of the posts for a user on the social network that may be stored in database 710, which may be presented to the user on display 520 of computer 500. In some implementations, queries by the user service application 420 for analysis of a draft post and/or one or more social network posts by the user for analysis by the PII tracking service application 402 may be submitted to the API service 418, which may provide the request to the data service interface 404. The analysis request may be transmitted to the analysis processor 414, which may analyze the content of the draft post, or may retrieve activity data from the server 800 of the social network via the data services interface 404. The content of the draft post and/or the content of one or more posts may be analyzed using the content analyzer 408, the network analyzer 410, and/or the thread analyzer 412. The content analyzer may determine whether there is PII in the draft post. The network analyzer 410 may generate a network graph for the user of the social network, and determine other users that they may influence and/or users that influence the user. The trend analyzer 412 may determine posting trends on the social network to determine whether the disclosure of PII is based on a posting trend (e.g., #TransformationTuesday, #FollowFriday, or the like).

In some implementations, one or more analysis models may be retrieved by the analysis processor 414 via the data service interface 404 from database 900 for use in analyzing the draft post and/or one or more posts to the social network. The analysis results may be stored in database 710, and/or may be provided to a user's computer 500 via the user interface 422.

Implementations of the presently disclosed subject matter may be implemented in and used with a variety of component and network architectures. FIG. 6 is an example computer 500 which may display a user interface for a social network (e.g., user interface 422) generated by server 800 and/or display a generated risk report generated by a server 700 based on the example methods shown in FIGS. 1-4D and described above.

As shown in FIG. 6, the computer 500 may communicate with a server 700 (e.g., a server, cloud server, database, cluster, application server, neural network system, or the like) via a wired and/or wireless communications network 600. The server 700 may be a plurality of servers, cloud servers, databases, clusters, application servers, neural network systems, or the like. The server 700 may include a processor 705, which may be a hardware processor, a microprocessor, an integrated circuit, a field programmable gate array, or the like. The server 700 may include a storage device 710. The storage 710 may use any suitable combination of any suitable volatile and non-volatile physical storage mediums, including, for example, hard disk drives, solid state drives, optical media, flash memory, tape drives, registers, and random access memory, or the like, or any combination thereof. The server 700 may be communicatively coupled to database 900, which may use any suitable combination of any suitable volatile and non-volatile physical storage mediums, including, for example, hard disk drives, solid state drives, optical media, flash memory, tape drives, registers, and random access memory, or the like, or any combination thereof. The server 700 may be communicatively coupled to server 800, which may be one or more servers, cloud servers, databases, clusters, application servers, neural network systems, or the like. The server 800 may include a processor 805, which may be a hardware processor, a microprocessor, an integrated circuit, a field programmable gate array, or the like Server 800 may include storage 810, which may use any suitable combination of any suitable volatile and non-volatile physical storage mediums, including, for example, hard disk drives, solid state drives, optical media, flash memory, tape drives, registers, and random access memory, or the like, or any combination thereof. The server 700 and/or server 800 may execute one or more application instances. The server 700 and/or 800 may use data from the database 900 in providing a storefront and/or website to an end user of the computer 500.

The storage 710 of the server 700, the storage 810 of the server 800, and/or the database 900, may store data for one or more instances of the application, updates for the application, and the like. Further, if the storage 710, storage 910, and/or database 800 is a multitenant system, the storage 710, storage 910, and/or database 800 can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, such as communications network 600.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 6 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "tokenizing," "labeling," "categorizing," "determining," "generating," "transmitting," "analyzing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
   receiving, at a server, activity data from one or more social networks that include one or more posts from a user;
   generating, at the server, a network graph based on the one or more posts from the received activity data;
   tokenizing, at the server, contents of the one or more posts;
   labeling and categorizing, at the server, the tokenized posts;
   determining, at the server, personally identifiable information (PII) from the labeled and categorized posts that are tokenized;
   determining, at the server, an influencing post that resulted in the one or more posts from the user that include the determined PII from the generated network graph by traversing relationships having at least a predetermined level of significance in the generated network graph to determine that an influencer post by one or more influencers has influenced the one or more posts of the user that include the determined PII;
   generating, at the server, a risk report based on determined PII in at least one of the labeled and categorized posts that are tokenized, wherein the risk report includes the influencer post that influenced the one or more posts of the user that included the PII; and
   transmitting, at the server, the generated risk report.

2. The method of claim 1, wherein the receiving the activity data further comprises:
   determining, at the server, whether the one or more social networks in the received activity data include the one or more posts.

3. The method of claim 1, further comprising:
   scheduling, at the server, an analysis of the received activity data.

4. The method of claim 1, further comprising:
   transmitting, at the server, a notification when the server determines that there is no PII in the labeled and categorized posts that are tokenized.

5. The method of claim 1, wherein the generation of the risk report further comprises:
   determining, at the server, a risk score of each of the categorized posts that are tokenized.

6. The method of claim 1, wherein the generation of the risk report further comprises:
   determining, at the server, an average risk score for the one or more posts.

7. The method of claim 1, wherein the generation of the risk report further comprises:
   generating, at the server, one or more recommended actions based on the determined PII in at least one of the labeled and categorized posts that are tokenized.

* * * * *